United States Patent

Pavliny

[11] 4,016,462
[45] Apr. 5, 1977

[54] BUILDING LIGHTNING PROTECTION SYSTEM

[76] Inventor: William Pavliny, 4722 N. Delphia Ave., Chicago, Ill. 60656

[22] Filed: Dec. 18, 1975

[21] Appl. No.: 641,881

[52] U.S. Cl. .................................. 361/117; 174/2; 361/216
[51] Int. Cl.² .................................. H02H 3/22
[58] Field of Search ........ 317/61, 61.5, 9 R, 262 R, 317/2 R; 174/6, 7, 2, 3

[56] References Cited

UNITED STATES PATENTS

| 196,518 | 10/1877 | Brown | 174/6 X |
|---|---|---|---|
| 234,484 | 11/1880 | Knudson | 174/6 X |
| 284,082 | 8/1883 | Sprang | 174/6 X |
| 623,033 | 4/1899 | Raunacher | 317/61 X |
| 652,861 | 7/1900 | Poche | 317/61 |
| 693,555 | 2/1902 | Lelong | 174/6 X |
| 1,098,738 | 6/1914 | Kretzer | 174/6 X |
| 1,244,118 | 10/1917 | Mullen | 174/6 X |

FOREIGN PATENTS OR APPLICATIONS

| 1,203,579 | 1/1960 | France | 317/61 |

OTHER PUBLICATIONS

"Lightning Protection Equip.," Independent Protection Co. Inc. Catalog No. C694, 1962, pp. 10 and 24.

Primary Examiner—J. D. Miller
Assistant Examiner—Patrick R. Salce

[57] ABSTRACT

Lightning protection system for roofed buildings having a waste pipe system comprising a series of interconnected waste pipes, a vent stack on the roof of the building, a soil pipe at the building site buried in electrically conductive contact with the ground, a lightning rod with a ball and a space discharge electrode atop the ball, and adapted to be supported by the stack without interfering with the stack's function, the series of interconnected waste pipes being in a building wall between and connecting the vent stack above and the soil pipe below and establishing a grounding circuit including the vent stack, and a bracket carried by the lightning rod and conductively affixed to the vent stack to render the grounding circuit complete to the space discharge electrode.

10 Claims, 7 Drawing Figures

U.S. Patent  April 5, 1977  Sheet 1 of 2  4,016,462
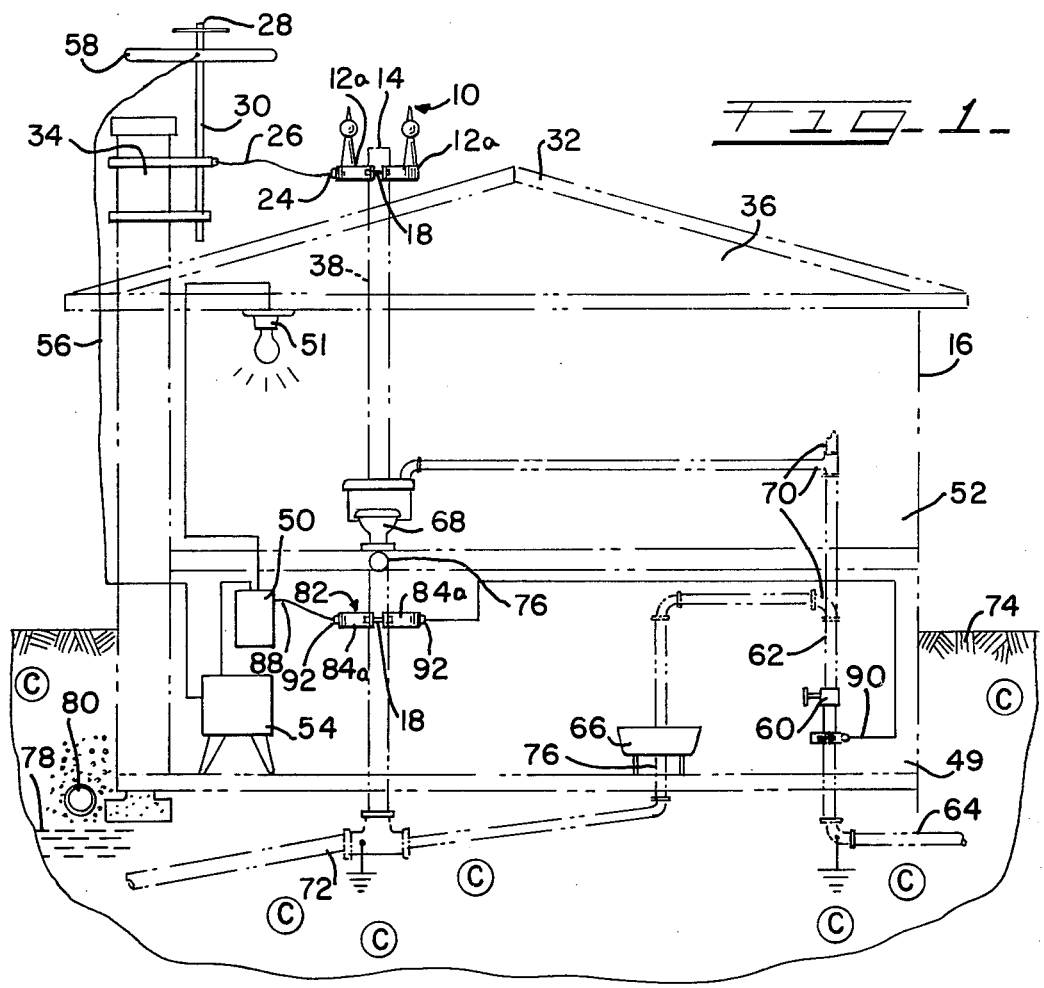
Fig. 1.
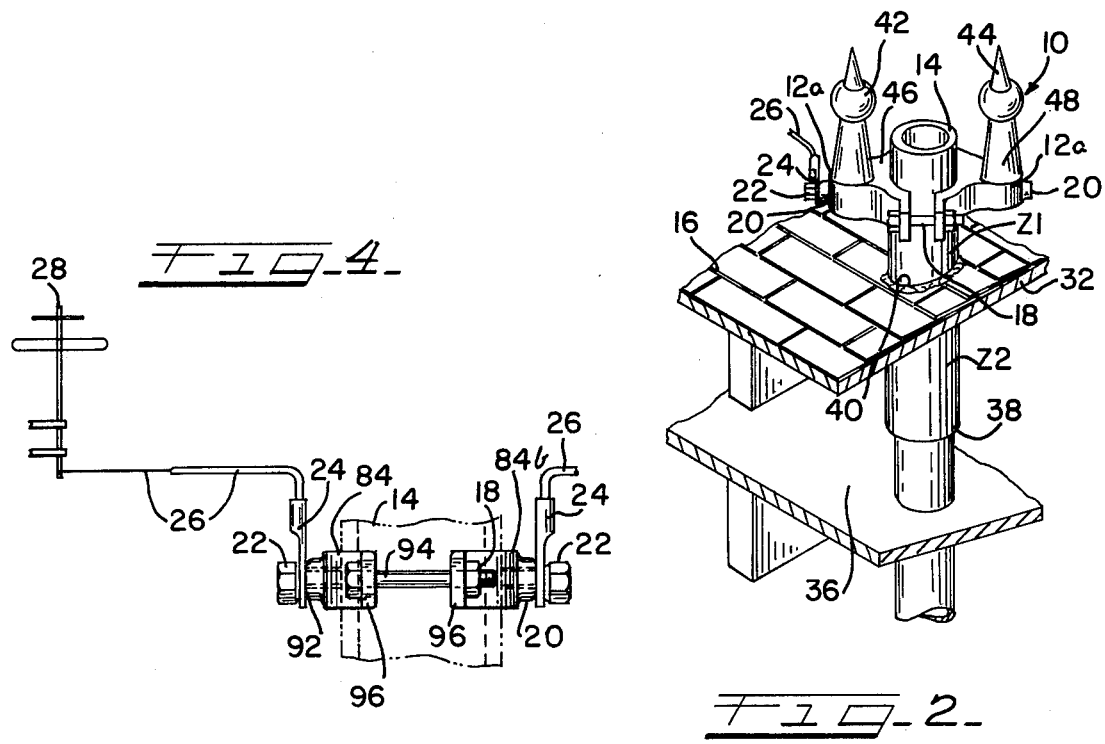
Fig. 4.
Fig. 2.

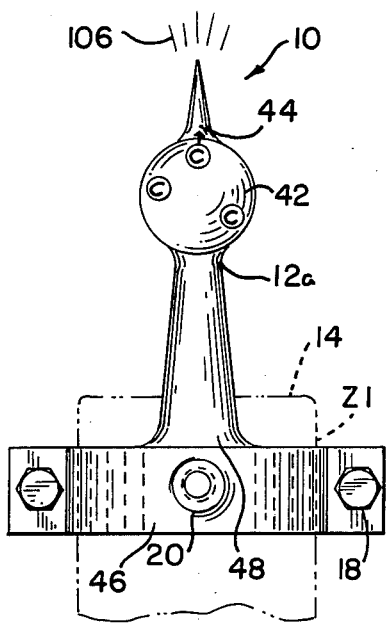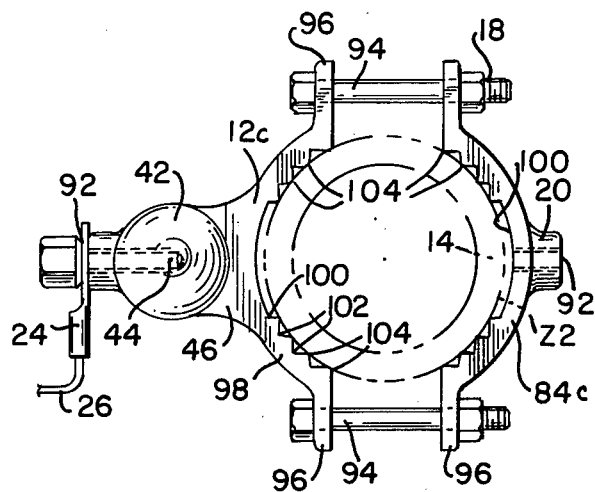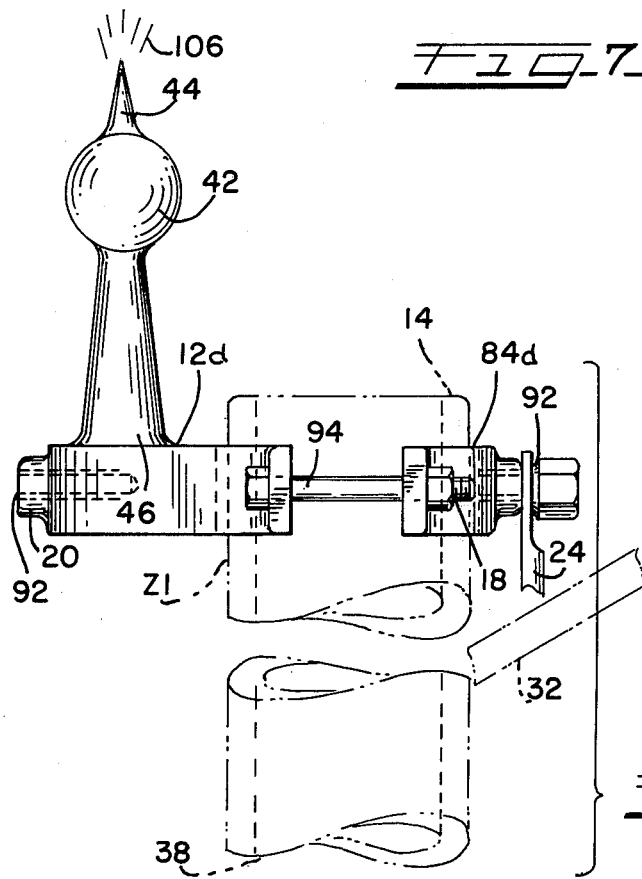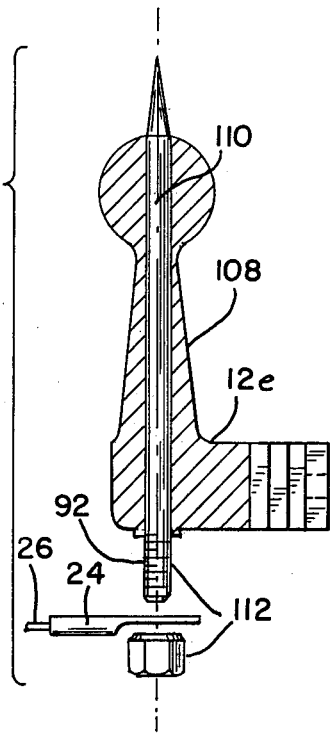

BUILDING LIGHTNING PROTECTION SYSTEM

This invention relates to a lightning protection system for building structures equipped with inside plumbing. More particularly, it relates to such structures as residential buildings and individual residences.

Protection systems against lightning have, according to practice in the past, utilized one or a series of independently mounted lightning rods located at or along high conspicuous roof points such as at peaks, the roof crest, and gable tops. A ground wire or a system of ground wiring plus a length of vertical pipe sticking out of the ground have been necessary to complete the system. It has therefore been the practice to run external wiring in standoff insulators along the roof edges and/or eaves so as to hang down the side of the building, and to drive pipe into the ground which is then connected at the upper end to the downhanging ground wire. What probably should amount to the basic deterrent against such practice would be the relatively low electrical carrying capacity involved because of the provable inefficiency of the usual length of pipe as it is ordinarily set in the ground to which the pipe is to electrically conduct. The actual deterrents to installation of those systems in the past have more generally run to the disfiguring and cluttering aspects of the system throughout the roof lines, and expensiveness for materials and labor to install. And, once installed, the system is generaally treated as a permanent appurtenance to the building; therefore even if desired, the system cannot be removed for relocation to a new residence or building. Removal of past systems has usually not proven desirable anyway because removal is difficult, it leaves holes which could cause leaks in the roof, and the ground wire is usually not worth removing because, in the direct exposure to weather, it deteriorates and so do the connections which should periodically be replaced anyway.

Need is felt for a novel system promising permanence, efficiency, aesthetics, economy, ready installation and/or removal without professional help, and reliability to help restore positive lightning protection to popularity. As property insurance records testify, building damage, due not only to lightning alone but also to lightning and the fire caused thereby to buildings, accounts for high annual financial loss, death, inconvenience, contamination, and destruction of our valuable resources and environment.

My invention is submitted substantially to alleviate the foregoing problems and deterrents, and generally to fulfill the foregoing need, as will now be explained in detail. Features, objects, and advantages will either be specifically pointed out or become apparent when, for a better understanding of the invention, reference is made to the following description taken in conjunction with the accompanying drawings, which show certain preferred embodiments thereof and in which:

FIG. 1 is a rear elevational view showing the floors of a house embodying the present lightning prevention invention;

FIGS. 2 and 3 are upper quarter isometric and outside face elevational views showing to an enlarged and to larger scale, respectively, one of the embodiments of the invention appearing in FIG. 1, in detail;

FIG. 4 is a side elevational view showing to enlarged scale another application of one of the embodiments of the invention appearing in FIG. 1, in detail; and FIGS. 5, 6, and 7 are top plan, side elevational, and side elevational sectional views showing modifications of the embodiments of the invention appearing in FIGS. 2 and 4.

More particularly in FIGS. 1, 2, and 3, a lightning protection device 10 according to the invention and comprising an electrically conducting pair of mating rod halves 12a is mounted on the outside to, and without interference with the functions of, an upper zone Z1 of a vent stack 14 in a house structure 16 illustrative as exemplary of residential and business building structures in general. I provide in the so-called multiple device 10 essentially a double lightning rod arrangement with the halves 12a identical and oppositely disposed at the sides of the stack 14 at zone Z1. Threaded tension fasteners 18 interconnect the halves 12a so as to draw them toward one another and clamp the stack 14 therebetween.

Each rod half 12a has an externally extending contact boss 20 which is drilled and tapped, and can thus receive a fastener bolt 22 that electrically conductively clamps a lead connector 24 to the contact boss 20. The lead itself is a ground lead 26 connected to a point on an antenna 28, preferably the mast 30 if a TV antenna, as is illustrated. The antenna 28 is an outside antenna mounted either independently on the roof 32 or, as actually illustrated, strapped to a vertical portion of a chimney 34 extending above the roof.

From the attic 36, if provided, or other upper portion of the structure 16, a projecting end section 38 of the stack 14 extends through an opening 40 in the roof 32 from below the plane of the latter to an outside point thereabove where it provides sole support for the device 10.

Each rod half 12a is unitary and includes a charge accumulating ball 42 of globular shape and a sharp pointed, upright space discharge electrode 44 atop the ball. A clamp half 46 forming a semicircular contactor bracket has its circular plane perpendicular to, and carries, a main rod section 48 forming the base for the ball, and the clamp half thus supports the section 48 and ball 42 in upstanding relation above the projecting end section 38 of the stack.

Overhead electrical disturbances of a given charge tend to cause a high concentration of the opposite electrical charge to be drawn to and collect at C, FIG. 3, on each ball 42. From there, the charge in the direction indicated by an arrow is readily dissipated by the tapering electrode 44 in known way into the ambient atmosphere surrounding. Thus if a thunder cloud, bearing a high negative charge, for instance, makes an approach to being overhead, no lightning bolt therefrom when the cloud starts to discharge will ordinarily tend to be drawn by the moderately positively charged device 10. The reason is the vital preliminary work of the electrode 44 in directing the high positive charge to rapidly leak and dissipate itself in the surrounding air before the latter can fully ionize and support a lightning arc.

Outside installations are not essential. Thus the same as made when there is an under-roof intallation of an antenna 28 to protect it from the weather, the installation of the device 10 can be readily be made in the attic 36 to the lower zone Z2 of the stack end section 38. While the antenna ground lead 26 will be confined to the attic space and just as effectively interconnect the antenna mast and device 10, and the lead and device 10 as well as antenna will be sheltered from the weather, the device 10 will lose its position of prominence above the section 38 and its exposure to air will be in the attic space at some level adjacent but lower than the plane of the roof 32.

ELECTRICAL SUPPLY SYSTEM — FIG. 1

In a family room area on the basement level 49 of the structure 16, a wall mounted circuit breaker box 50 or equivalent receives electricity in usual way from a neighborhood utility transformer, not shown. Two-wire or three-wire cable including a ground wire and passing in horizontal runs and vertically in the walls conducts electricity supplied by box 50 to numerous house loads such as the illustrated lamp 51 in a ceiling area on the first floor level 52, and the illustrated television receiving set 54 in the basement family room area. A TV twin-lead 56 following generally down the chimney 34 completes the receiving apparatus by interconnecting the insulated antenna elements 58 and the television set 54.

WATER SUPPLY SYSTEM — FIG. 1

A main water shut-off valve 60 is connected in a vertical riser line 62 leading from a buried supply line 64 of a water supply distribution system. The shut-off valve 60 is in a utility area on the basement level 49 and controls flow of fresh water to points of consumption outside of, and inside of, the house such as the illustrated double laundry tub 66 in the basement utility area and the illustrated commode 68 in a bath area on the first floor level 52. The network of water pipes in the system is indicated generally at 70 and spreads throughout one main outside wall of the structure, e.g., the rear wall, and elsewhere.

WASTE PIPING SYSTEM — FIG. 1

Included in this system, a buried soil pipe 72 located at the building site in, and forming a highly conductive ground with, the earth 74, is pitched toward the usual sewer or equivalent, not shown. Also included is a series of interconnected waste pipes 76 in a wall or two of the building, and interposed between and connecting the vent stack 14 above the soil pipe below; drainage from the illustrated tub 66 and commode 68 passes down the pipes 76.

Surface drainage accumulates to one degree or another at 78, underground in the vicinity of drain level and the drain tile 80 about the house foundation, and in the sump for a sump pump, if any, not shown. The wetness, even in moderate amount, helps to improve the grounding capacity of the pipes 64 and 72 buried in the soil, and also improves earth conductance throughout the immediate soil area.

At a convenient point on a main waste pipe 76, illustrated to be at basement level 49 in the structure shown, I locate a clamped device 82 formed of contactor bracket halves 84a and being accessible to the box 50 and water supply riser 62. Threaded tension fasteners 18 interconnect the halves 84a so as to draw them toward one another and clamp the waste pipe 76 therebetween. Ground leads 88 and 90, respectively, from the box 50 and riser 62, are conductively connected to ground terminals 92 on the bracket halves 84a, thus interconnecting all three systems of FIG. 1 as one system to multiply the integrated conductors available for enhanced grounding. In some of the instances where the builder has not provided the usual ground wire connection between the water supply and electrical supply systems, it is generally preferable to provide as well that interconnection, not shown.

STAGES OF OPERATION — FIG. 1

During an electrical storm in which the overhead disturbance carries a charge of one electrical algebraic sign, a charge of static electricity of opposite algebraic sign naturally occurring in the wires and pipes of the electrical, water, and waste systems, and more massively occurring in the earth 74 and indicated throughout the immediate area at C, emerges from these various sources collectively and flows upwards where it concentrates in the balls 42 of the prominently exposed device 10. The pointed electrodes at their high level rapidly and efficiently bleed off the charge into the immediately surrounding air and drastically lower the local ground potential to a safe value. So if the illustrated house 16, protected as shown, has a similar but unprotected house situated nearby, the latter will obviously be the one and commonly the sole one to draw lightning. This protective stage provided by my invention is especially important, and renders realty safer and more readily insurable.

A further protective stage is equally important, for example, during a sudden, concentrated, active electrical disturbance. In the case of a flurry of overhead discharges, one lightning bolt may go in the direction of the protected house 16, in which case the prominent device 10 and balls with a reduced charge thereon will intercept and tend to guide the lightning harmlessly down the stack 14, whence it will follow the low resistance, massive path of the waste pipe or waste pipe and water pipe leading downwardly, directly to a ready discharge and full dissipation into the infinite capacity of the earth 74. It follows then that in the event a protected house is struck and a similar, unprotected house nearby is also struck, the latter will be the one and possibly the sole one susceptible to the damage caused by lightning and/or fire caused thereby.

At the foregoing stage when there occurs such a concentrated flurry of overhead discharges, side arcs therefrom and stringer arcs may tend to be promulgated in a ricochetting fashion, with the possibility of seeking ground via wires, antennas, and pipes of a house. However, my integrated lightning protection system provides a massive ground path collectively which, as can be readily appreciated, enables whichever wire, antenna, or pipe that is hit to feed the discharge directly and harmlessly down the ground path without likelihood of further ricochet.

During electrical storms, the earth 74 is usually in a drenched, exceedingly conductive state, which obviously aids my integrated system at all the above stages of house protection. The buried pipes 64 and 72 in their radiating pattern materially aid in gathering and carrying in the centrally moving ground charge.

CLAMPED DEVICE MODIFICATION — FIG. 4

The device as modified according to this figure can be given an under-roof or above-roof mounting depending upon whether there are one or more under-roof or above-roof antennas 28 located nearby. The bracket halves 84b of the device are symmetrical, and so to the terminal 92 of each half 84b the mast ground lead 26 of an antenna is grounded.

The threaded tension fasteners 18, one on each side, each consist of a nut and bolt 94 which are typical of the fasteners I provide for clamping herein. The nut and bolt 94 are received in holes in end section clamp ears 96 on the halves which register in closely spaced apart relation at each side where a fastener 18 is present. The clamping action holds the stack 14 tightly in whatever zone level thereof, upper Z1 or lower Z2, is occupied by the device.

Each terminal 92 consists of the described drilled and tapped, extending contact boss 20, a fastener bolt 22 therein, and the ground lead 26 with an end connector 24 clamped electrically conductively between the head of the bolt 22 and contact boss 20, which are typical of the terminals I provide for grounding leads.

SINGLE ROD AT ZONE Z2 — FIG. 5

In this under-roof modification of the invention, the rod half 12c and bracket half 84c which form the mating halves of the devices are shown with the rod half terminal 92 in use conductively connected to an antenna ground lead 26, and the bracket half terminal 92 not in use and incomplete except as to the unused contact boss 20.

Because of the pipe of vent stacks 14 usually having the size of standard pipe such as 2 inches (51 mm.) and 4 inches (102 mm.) pipe, the halves 12c and 84c will each keep the same proportions according to the standard illustrated or some other standard desired, but will have graded sizes each so as to fit up properly to a standard size vent stack. The clamp half 46 of rod half 12c has a generally semicircular contactor bracket section 98 with the respective clamp ear sections 96 integral therewith at the opposite ends. Adjacent and flanking the section 98's center portion of relief, to which portion the main rod section for the ball 42 is fixed and which provides some slight arcuate flexibility to the metal thereof, the semicircular section 98 has two four-serration sets of axially extending serrations 102 which are internally provided on the concave face to form a series of sharp, semicircularly spaced apart, projecting contacts 104 lining the end portions of the section 98.

It is recommended that, preparatory to clamping to the outside surface of any waste pipe or vent stack with the devices hereof, the surface be ridded of all paint, tar, other covering, or rust, right down to the bare metal for low ohmic conduction to the metal. For added assurance along that line, the sharpness of the corner line edges of the contacts 104 will afford effective cutting action through to the metal in a ring or circle of good electrically conductive connection points under clamping pressure on the ears 96 by the tension fasteners 18.

The sharp projecting contacts 104 are typical for all clamp halves 46, and the same contacts 104 shown lining the bracket half 84c in semicircularly spaced apart relation are typical for all bracket halves herein. The contactor bracket section 98 and bracket half 84c are, typically, symmetrical forming mirror images of one another.

SINGLE ROD AT ZONE Z1 — FIG. 6

In this above-roof modification, a rod half 12d and a bracket half 84d are shown combined together, with the rod half terminal 92 not in use and incomplete except for an unused contact boss 20, and the bracket half terminal 92 terminating the connector 24 of an antenna ground lead, not shown. The charge dissipating effect of the single rod electrode 44 into the atmosphere is indicated at 106.

EN BLOC MODIFICATION — FIG. 7

In a modified embodiment of my invention as shown according to this figure, the device 12e is a rod half which, for its major portion, is unitarily preformed as a body 108 cast with a pre-machined, longitudinally disposed insert 110 permanently embedded coaxially in the metal of the casting. The insert 110 can, in one practical form, consist of a five-sixteenth inch (7.94 mm.) straight metal rod 10 inches (254 mm.) long which is threaded and then smoothly conically pointed at the upper end as viewed in FIG. 7. The terminal 92 at the lower end is made with a stud-and-threaded-on-nut 112 in lieu of the previous side-mounted bolt-and-boss grounding terminal.

The apertured connector 24 of the ground lead 26 of some external device to be grounded is conductively clamped by the nut in the bottom terminal 92 against the bottom of the body 108 of the casting. Clamping of the rod half 12e to a vent stack is done as previously set out, and will not be described at this point.

The purchaser of my devices may wish to supply himself with several rod halves of the graded sizes of the one 12d as shown in FIG. 6, and several bracket halves of the graded sizes of the one 84d. With that relatively modest supply, a homeowner can fit his vent stacks and waste pipe with all of the foregoing combinations of mating halves which are self-gripping on the standard pipe which supports them. The homeowner can readily make all installations himself, and the devices are just as readily removable by him. Thus, he has the choice of leaving them as a lifetime installation or of removing and relocating the devices on a new residence or building.

The metal of both halves of each device is aluminum, brass, or cast iron, for example, and the components such as electrode, terminal and tension bolts, and balance of body can be made, although not necessarily, of different metal from one another. One illustrative, very satisfactory combination of parts of different metal in the embodiment of FIG. 7 utilizes a machined brass insert 110 of a highly conductive, high copper content brass such as red brass, and an aluminum body 108 cast thereabout. If the electrode only is to be made of a different or of the same metal as the ball, the electrode can be premachined separately as a short, conically tapered stud and threaded in or pressed in an appropriately formed receiving bore in the top of the ball.

Also, the metal of each half of each device can be a one-piece casting. Irrespective however, casting or not, or one-piece or not, the surface of each piece can be variously treated against weathering. The treatments contemplated include anodizing, chrome plating, and the like, depending upon the metal.

At least one outside wall of the structures to be protected contains networks of the wires and pipes illustrated and, depending upon the structural design and construction, one or more other outside walls do the same, cooperatively with a modified Faraday cage effect. So the unified grounding system hereof, providing multiple wire-and-pipe paths, proves very effective for its purpose.

Further, all of the building vent stacks will be equipped with the device and, for maximum protection, equipped with the multiple installed embodiment of FIG. 2, preferably. As a currently building charge is depleted in that embodiment the rods, due to the combined capacity of their charge accumulating balls, draw more of the charge through the pipes and wires to the point of high elevation of the rods.

The antenna masts, which are each one desirably electrically tied into my readily accessible grounded system, afford valuable protection in preferentially taking a direct lightning hit rather than the insulated antenna elements which are adjacent, the latter being directly electrically connected to the delicate and vulnerable receiving set 54 itself.

Variations within the spirit and scope of the invention described are equally comprehended by the foregoing description.

What is claimed is:

1. In a roof-covered building with inside plumbing including a waste piping system, said system comprising a vent stack leading from within an upper portion of the building toward the roof and having a projecting end section extending through an opening in the roof from therebelow to an outside point above the roof, a soil pipe at the building site in, and forming a highly conductive ground with, the earth, and a series of interconnected waste pipes in the building between and connecting the vent stack above and the soil pipe below and completing the grounded waste piping system:

the combination with the waste piping system, of electrically conductive lightning prevention means supported in conductive relation on the projecting end section of the vent stack, the first said means including a charge-accumulating ball, conductive bracket means connecting the first said means to the stack projecting end section, and a generally upright sharp pointed, space discharge electrode atop the ball.

2. The combination in accordance with claim 1 in a roof-covered building, said building including an electrical supply system and said inside plumbing therein further including a water supply system:

said combination further including the water and electrical supply systems, and electrically conductive means interconnecting the waste piping system with at least one of said water supply and electrical supply systems to multiply the integrated conductors available for enhanced grounding.

3. The invention of claim 2 wherein the electrically conductive interconnecting means is characterized by:

means directly connecting each of the water, electrical, and waste piping systems to at least one other of the systems so that they are all interconnected, comprising a ground lead from one of the water and electrical systems, said waste pipe series having one waste pipe with conductive bracket means thereon for electrically connecting said ground lead to same, said conductive bracket means having at the outside an electrical terminal including an externally contact boss and a clamping fastener secured in said boss and clamping the ground lead thereto in conducting relation for enhanced grounding.

4. The invention of claim 1, wherein said electrically conductive lightning prevention means comprises a double lightning rod arrangement with essentially identical conductive bracket halves which are oppositely disposed about, and held together about, the stack end section, and generally symmetrically disposed balls supported one on each bracket half and electrodes supported one on each ball and spaced apart generally equally away from the intervening stack end section.

5. In a roof-covered building provided with an electrical supply system including receiving apparatus and with inside plumbing including a waste piping system, the receiving apparatus being supplied by said supply system, and comprising antenna means for reception supported at about roof level on one side of the plane of the roof, and having a ground lead therefrom, said piping system comprising a vent stack leading from within an upper portion of the building toward the roof and having a projecting end section extending through an opening in the roof fron below the plane thereof to an outside point above said plane, a soil pipe at the building site in, and forming a highly conductive ground with, the earth, and a series of interconnected waste pipes in the building between and connecting the vent stack above and the soil pipe below and completing the grounded waste piping system:

the combination with the antenna means and piping system, of electrically conductive clamped means adjacent the roof and on said one side of the plane thereof, and comprising essentially identical contactor bracket halves which are oppositely disposed on the sides of, and held together about, the stack end section, said contactor bracket halves having a generally semicircular section with opposite end ears, and with sharp semicircularly spaced apart projecting contacts lining portions of each eared semicircular section for establishing plural electrically conductive connection points with the confronting stack section side when clamped thereto, said ears having closely spaced apart adjacency to, and registry in sets with, one another, and having tension fasteners provided one for each set of registering ears to interconnect same under clamping tension, said contactor bracket halves each having at the outside an electrical terminal including an externally extending contact boss and a clamping fastener secured in said boss for clamping thereto the ground lead from the antenna means in conducting relation to complete the circuit through to the earth.

6. Electrically conductive lightning rod for mounting to building structures at about roof level comprising, in combination with building hollow vent stack waste piping plumbing means of upstanding elongated metal construction extending through the roof to provide a grounded support:

a charge accumulating ball with a main rod at the base, and a pointed, space discharge electrode atop the ball;

said main rod having a section comprising a supporting, essentially semicircular contactor bracket half clampingly receiving therein the vertical confronting side of the elongated hollow metal upstanding support, said main rod having fastener clamp ears provided at opposite ends of its semicircular section, and being perpendicular to the plane of, and secured to the latter, said supporting contactor bracket half having semicircularly spaced apart projecting contacts lining concave portions of the eared semicircular bracket section of the main rod establishing a partial ring of semicircularly spaced apart, electrically conductive connection points with the vertical confronting support side when clamped thereto with the clamp ears to complete a grounded circuit therewith from the electrode.

7. The invention of the first rod according to claim 6, in combination with:

an essentially duplicate electrically conductive, lightning rod oppositely disposed to the first rod for mounting upright therewith with their fastener clamp ears in registry in closely spaced apart relation; and tension fasteners provided one for each set of registering ears to interconnect same under tension for clamping-on the first rod and its duplicate, aforesaid.

8. The invention of claim 6, in combination with:

clamp completing means comprising an essentially duplicate semicircular contactor bracket half oppositely disposed so that the bracket halves present their respective projecting contacts in a completed ring of electrically conductive connection points and present their respective fastener clamp ears mutually in registry in closely spaced apart adjacency;

tension fasteners provided one for each set of registering ears to interconnect same under tension for clamping-on the bracket halves for their mutual support together;

said electrode comprising first rod means secured in and projecting taperingly upstandingly from the ball; and second rod means secured in and projecting threadingly dependingly from the center portion of the semicircular bracket section of the main rod to receive a fastener for clamping on an electrical grounding connector in conducting relation thereto.

9. The invention of claim 8, characterized by:

said ball and main rod being formed as an en bloc piece separate from the forming of the first and second rod means.

10. The invention of claim 6, characterized by:

said electrode comprising a short, conically tapered stud;

said ball including a receiving bore formed in the top and having the stud secured therein.

\* \* \* \* \*